United States Patent [19]
Isensee et al.

[11] Patent Number: 5,490,244
[45] Date of Patent: Feb. 6, 1996

[54] SYSTEM AND METHOD FOR TRANSMITTING A COMPUTER OBJECT

[75] Inventors: Scott H. Isensee, Georgetown; Ricky L. Poston, Austin, both of Tex.

[73] Assignee: International Business Machines Corporation, Armonk, N.Y.

[21] Appl. No.: 216,996

[22] Filed: Mar. 24, 1994

[51] Int. Cl.⁶ .................................................. G06F 3/00
[52] U.S. Cl. ........................... 395/159; 395/200.01
[58] Field of Search ................................. 395/152–161, 395/200, 600, 725; 345/117–120, 146; 358/400–404

[56] References Cited

U.S. PATENT DOCUMENTS

| | | | |
|---|---|---|---|
| 4,899,136 | 2/1990 | Beard et al. | 395/155 |
| 5,093,918 | 3/1992 | Heyen et al. | 395/725 |
| 5,161,213 | 11/1992 | Knowlton | 395/155 |
| 5,408,333 | 4/1995 | Kojima et al. | 358/400 |
| 5,436,639 | 6/1995 | Arai et al. | 345/156 |
| 5,438,660 | 8/1995 | Lee et al. | 395/155 |

OTHER PUBLICATIONS

Hirakawa et al., "A Framework for Construction of Icon Systems", IEEE, 1988, pp. 70–77.
Clarisse et al., "An Icon Manager in Lisp", IEEE Workshop, 1985., pp. 116–131.
"Pizza Icon", IBM Tech. Discl. Bull., Nov. 1992, p. 265.
DeskSet Environment Ref. Guide, Sun Microsystems, 1990, pp. 40–41.
"Mastering Windows 3.1", Sybex, Inc., 1993, pp. 129–137.

*Primary Examiner*—Mark R. Powell
*Assistant Examiner*—John E. Breene
*Attorney, Agent, or Firm*—Diana L. Roberts

[57] ABSTRACT

The present invention is a system and method for transmitting objects of varying types from one processing unit to another using a transporter. The present invention enables the user to create and iconically display each transporter and object icon on a display. At object type definition, the user enters the characteristics of each object type once into a database. Furthermore, at transporter creation, the user enters the transmission command and destination address for each transporter once into a database. As such, the transporter is capable of transmitting numerous objects to a predefined processing unit without continuously prompting the user for object characteristics, mailing protocols, or destination addresses.

10 Claims, 4 Drawing Sheets

SYSTEM AND METHOD FOR TRANSMITTING A COMPUTER OBJECT

BACKGROUND OF THE INVENTION

1. Field of the Invention

The following invention relates to improvements in graphical user interfaces and, more particularly, to a system and method for transmitting a computer object.

2. Description of the Related Art

Current electronic mail systems residing on, for example, desktops or graphical user interfaces of operating systems are typically designed for transmitting text files. Increasingly, however, users desire to transmit other types of objects, such as audio, video, images, data in varying formats, and program objects.

If conventional mail systems are even able to transmit these object types, they require the object type to be individually identified each time it is transmitted. That is, the user must identify the characteristics of the object (e.g., name of the object type, permissions, and/or content) and provide a series of instructions for sending that specific object type. These instructions include mailing protocol and the destination address.

However, the characteristics of files belonging to the same object type are often identical. Similarly, the user often desires to transmit a large number of objects to the same destination. Unfortunately, however, the user must repeat the previously described process each time the system transmits an object. Obviously, this process is difficult, time consuming, and error prone.

Therefore, great demand exists for a mailing system that permits the user to establish the characteristics of an object-type only once. Furthermore, this mailing system should permit the user to establish the mailing protocol and destination address for a destination only once.

SUMMARY OF THE INVENTION

Accordingly, a system and method permit transmission of objects from one processing unit to another using a transporter. This system and method enable the user to create and iconically display each transporter and object on a display. At object type definition, the user enters characteristics of the object type only once into a database. Furthermore, at specific transporter creation, the user enters its mailing protocol and destination address only once into a database. As such, the transporter can transmit numerous objects of the same, or different object type, to a predefined processing unit without continuously prompting the user for object characteristics, mailing protocols, or destination addresses.

Therefore, it is an object of the present invention to provide a mailing system that allows the user to create and iconically display a transporter on a display.

It is a further object to provide a transmission system that allows the user to supply the characteristics of each object type only once.

It is another object to provide a transmission system that allows the user to supply the transmission protocol and destination address of a transporter only once.

These and other objects will become apparent in light of the following drawings and detailed description.

DETAILED DESCRIPTION OF THE PREFERRED EMBODIMENT

The present invention operates on a computer system having a processing unit, system memory, and various input/output and other peripheral devices. Specifically, the preferred embodiment of the present invention operates on an IBM RISC (Reduced Instruction Set Computing) System/6000 computer running the AIX (Advanced Interactive Executive) operating system (IBM, RISC System/6000, and AIX are trademarks of the IBM Corp.). However, it should be understood that the present invention can be implemented on other hardware platforms and on other operating systems.

Figure 1:
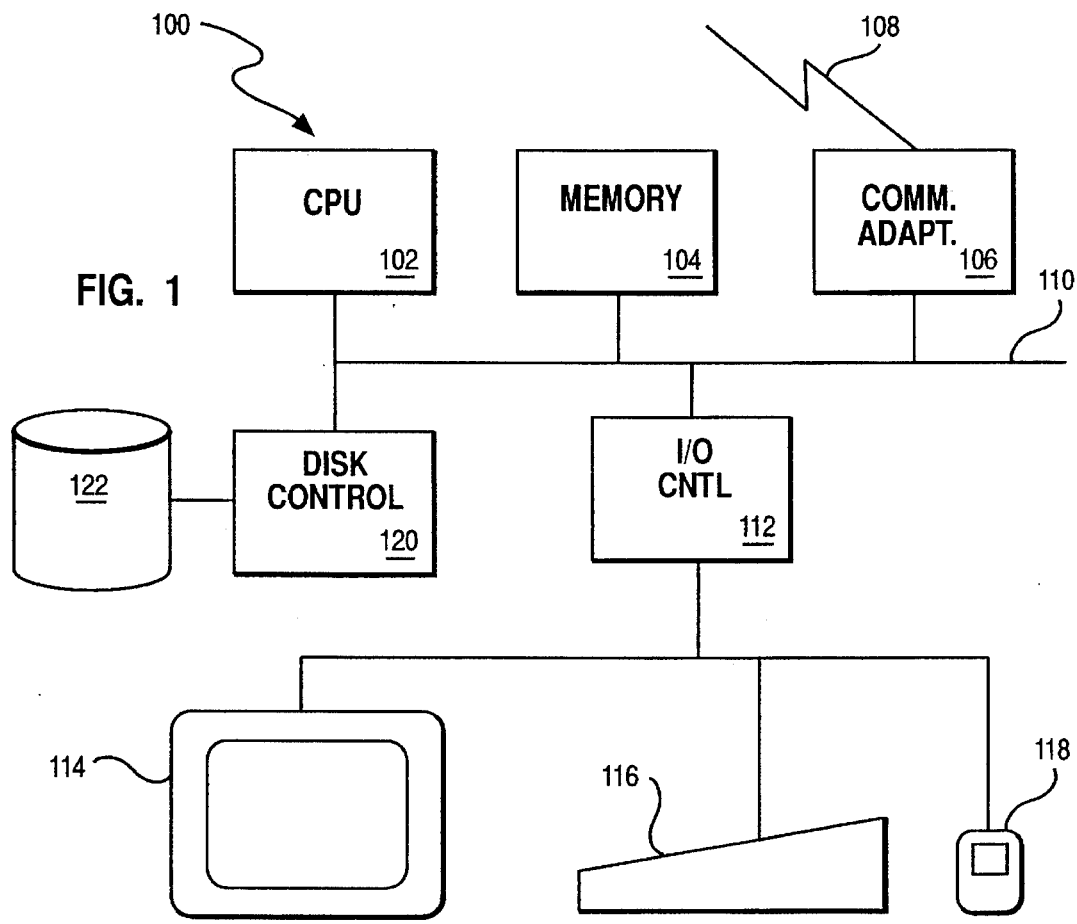
FIG. 1 is a schematic diagram of a computer system for use with the present invention.

More particularly, the present invention directs the operation of a computer system having the components shown generally in FIG. 1. Processing is provided by a central processing unit (CPU) 102. CPU 102 acts on instructions and data stored in random access memory 104. One or more disks 122, controlled by disk controller 120, provide long term storage. A variety of other storage media could be employed, including tape, CD-ROM (Compact Disk Read Only Memory), or WORM (Write Once, Read Many) drives. Removable storage media may also be provided to store data or computer process instructions.

Users communicate with the system through I/O devices which are controlled by I/O controller 112. Display 114 presents data to the user, while keyboard 116 and pointing device 118 allow the user to direct the computer system. Communications adapter 106 controls communications between this processing unit and other processing units connected to a network by network interface 108.

The present invention is a system and method for transmitting objects from one processing unit to another processing unit within the network using transporters. The system represents each transporter and object with an icon that is displayed on display 114.

The transporter icon enables the user to transmit an object to a desired processing unit. That is, the transporter icon establishes a transmission channel between the object and the desired processing unit. To do this, the user uses a suitable pointing device, such as a mouse, to drag and drop the object over the transporter icon, thereby transmitting the object to the desired processing unit. This drag/drop procedure is well known in the art and need not be further described.

Figure 2:
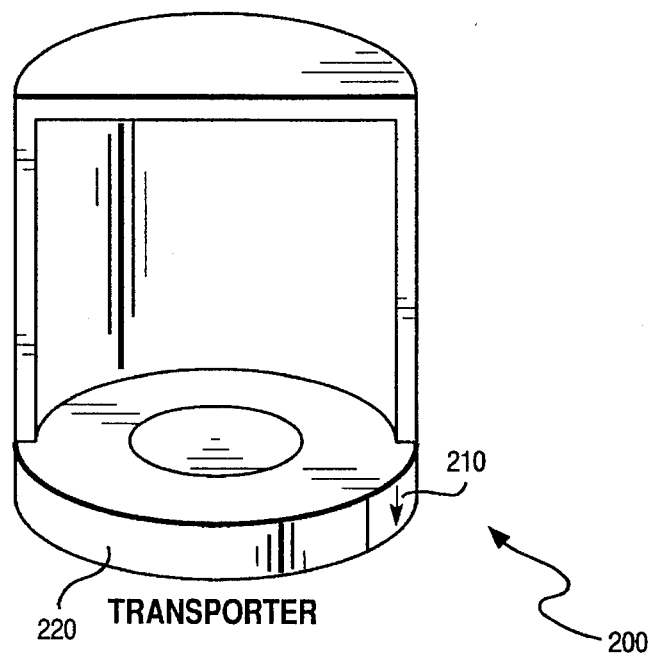
FIG. 2 is a schematic diagram of the transporter icon of the present invention.

Referring to FIG. 2, transporter icon 200 may be either "general" or "specific". A general transporter prompts the user for the destination address and transmission protocol at the time of transmission. For a general transporter, label field 220 displays the label "TRANSPORTER". The present invention provides the user with one general transporter that resides on a desktop or graphical user interface.

A specific transporter has a predefined mailing protocol and destination address that are defined by the user at the transporter's creation. As such, any object dropped on a specific transporter will be transmitted to that predefined destination only. Furthermore, label field 220 displays a user-created label for the destination of the specific transporter. Illustratively, if the destination was predefined to workstation number 3, the user could define label field 220 as, for example, "WORKSTATION 3".

Moreover, regardless of whether the current transporter is specific or general, the user can position the pointer over arrow 210, single-click the pointing device, and a resulting drop-down list (not shown) appears. This drop-down list displays all previously created specific transporters. The user can scroll down the drop-down list using the pointing device and select the desired specific transporter. In turn, the selected specific transporter replaces the current transporter.

Figure 3:
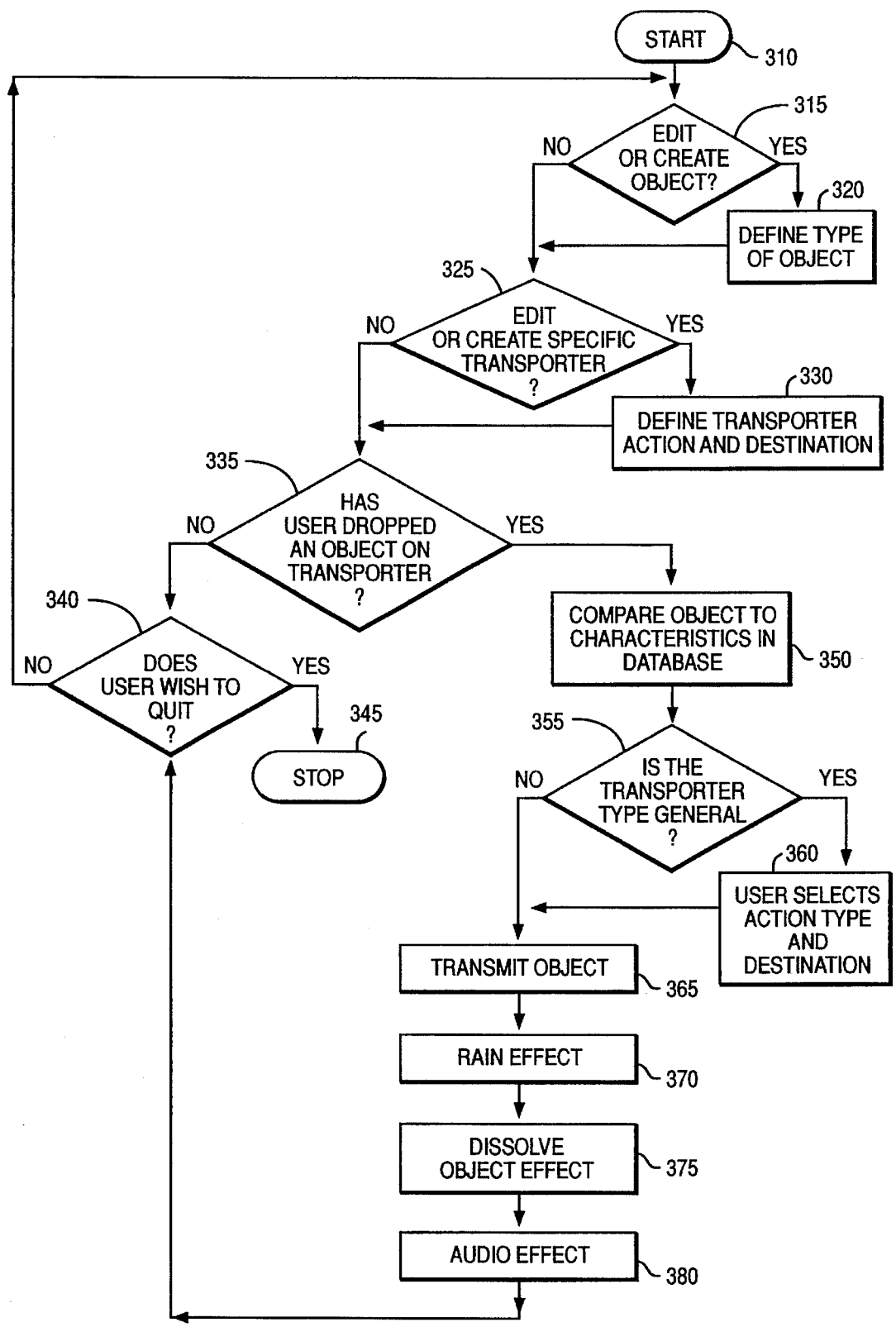
FIG. 3 is a flow chart illustrating the decision making processing of the present invention.

The flow of execution for the present invention is as follows:

Referring to FIG. 3, the user must decide at 315 whether he/she desires to define a new object type or edit an existing object type. If so, the user defines or redefines the object type at 320. To define a new object type, the user accesses a pop-up window (see FIG. 4, described herein) by positioning the pointer over an "object type" template (not shown) and double-clicking the pointing device. The user then enters the characteristics (described herein) of the object type through the keyboard. These characteristics are stored into a "object type definition" database for further use. Once these characteristics are entered, the system displays an icon (not shown) representing the object type definition on the display.

To redefine an existing object type, the user accesses the pop-up window by positioning the pointer over the displayed object and single-clicking the pointing device. A resulting pop-up menu appears on the display. The user then changes the characteristics of the object type through the keyboard. Again, these characteristics are stored into the "object type definition" database for further use. Alternately, other standard user interface techniques in accordance with the host operating system could be used to access the pop-up window.

Figure 4:
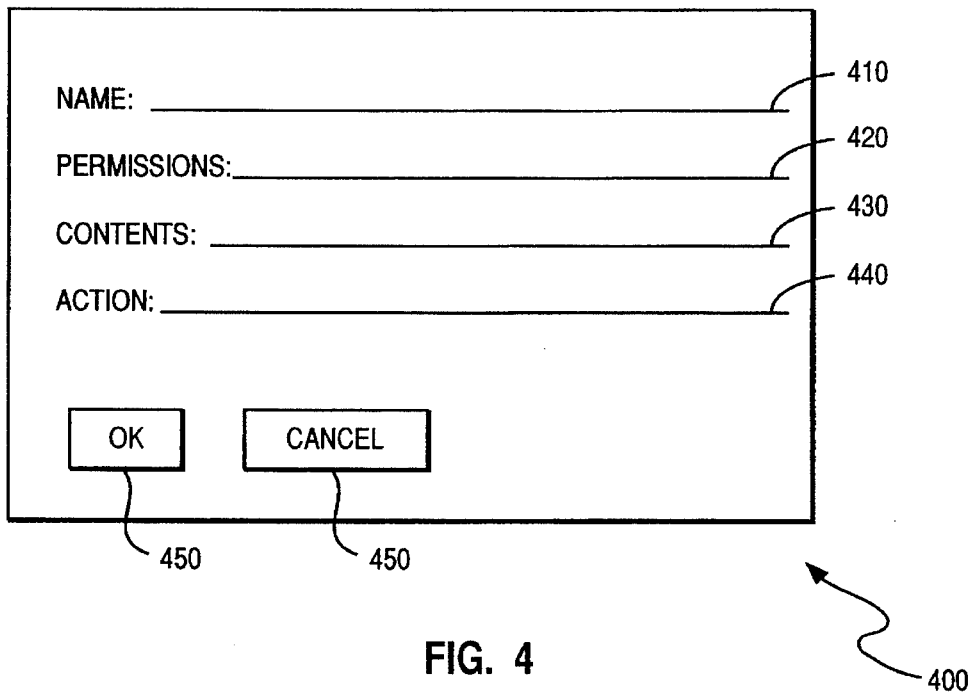
FIG. 4 is a dialog window for creating or editing an object according to the present invention.

FIG. 4 illustrates pop-up window 400 for creating or editing an object type. Each of the fields represents a different way to identify (define) an object type. One or more of these fields can be used. Window 400 comprises "name" field 410 for entering the name of the object type. Illustratively, the user can use the keyboard to enter "*.txt" for text files, "*.VID" for video files, "*.AUD" for audio files, "*.GIF" for graphics files, "*.PS" for postscript files, "*.ASCII" for ASCII (American Standard Code for Information Interchange) files, or any first name such as "FRED.*". As such, the system defines the characteristics of all text, video, audio, graphics, postscript, ASCII, and other types of files.

In addition, permissions field 420 enables the user to identify accesses/permissions for each object type. For example, the user could specify that any file with read-only permission would be classified (recognized) as a particular type of object.

Contents field 430 allows the user to define an object type by specifying that the object (file) contains a particular character, word, or word string stored inside the object. For example, if the user enters the string "%P" in the contents field, any object containing that string will be transmitted by the action (command) specified for this string object type.

Further, action field 440 establishes the type of transmission scheme or protocol. Illustratively, for the AIX operating system, the user could enter either of the commands "mail" or "FTP" into action field 440. The command "mail" represents general electronic mailing, whereas "FTP" represents file transfer protocol. Obviously, these commands vary according to the protocol and syntax of the host operating system and network. Therefore, any valid transmission command could be used.

However, one skilled in the art will readily recognize that other techniques within the scope and spirit of the present invention may be used to define or redefine an object type. For example, the user may access a window, drop-down list, or dialog via a scroll bar or title bar. In addition to a keyboard, any suitable pointing device may be used, such as a mouse or touch screen.

Returning to FIG. 3, control passes to 325, where the user decides whether to create a specific transporter or edit an existing specific transporter. To do this, the user defines or redefines the transporter action and destination at 330 by accessing a pop-up window (see FIG. 5). To create a specific transporter, the user positions the pointer over a "transporter create" template (not shown) and double-clicks the pointing device. The resulting pop-up window appears on the display.

Next, the user enters the name label and selects an action and destination address of the specific transporter through the keyboard. These characteristics are stored into a database for further use. Once stored, an icon representing the transporter is displayed on the display.

Figure 5:
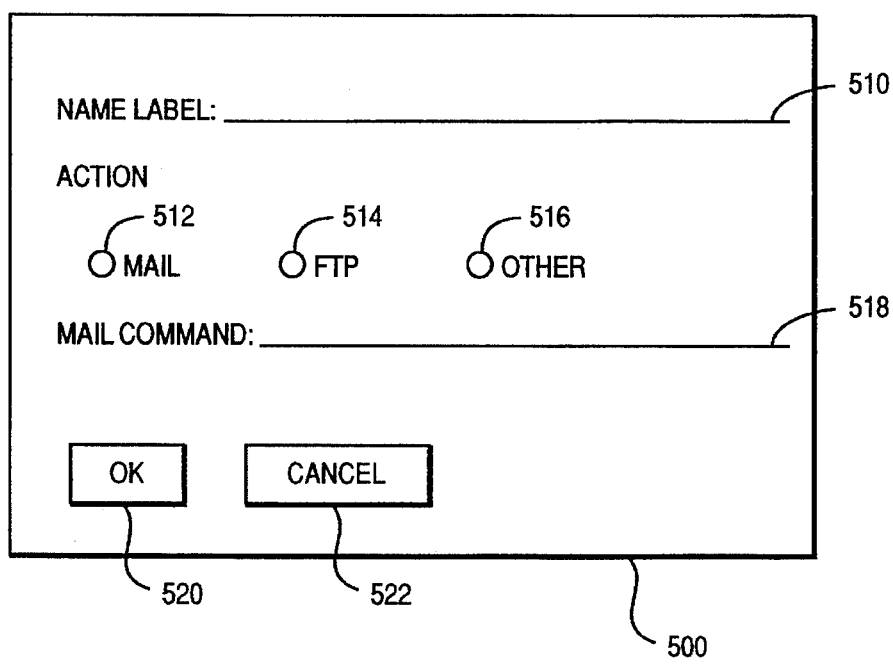
FIG. 5 is a dialog window for creating or editing a specific transporter according to the present invention.

FIG. 5 illustrates pop-up window 500 for creating or editing the transporter's action and destination. Label field 510 allows the user to enter the name of the specific transporter. However, for a general transporter, label field 510 automatically displays "TRANSPORTER".

To establish the transporter's action, the user positions the pointer over mail button 512, FTP button 514, or button 516 and single-clicks the pointing device. Alternatively, the user can enter a different mail command in "mail command" field 518. This field is provided for instances where the user wants to transmit objects using some command other than "mail" or "FTP" Once selected, the user clicks OK button 520 or, alternatively, cancels the entire procedure by clicking cancel button 522.

Figure 6:
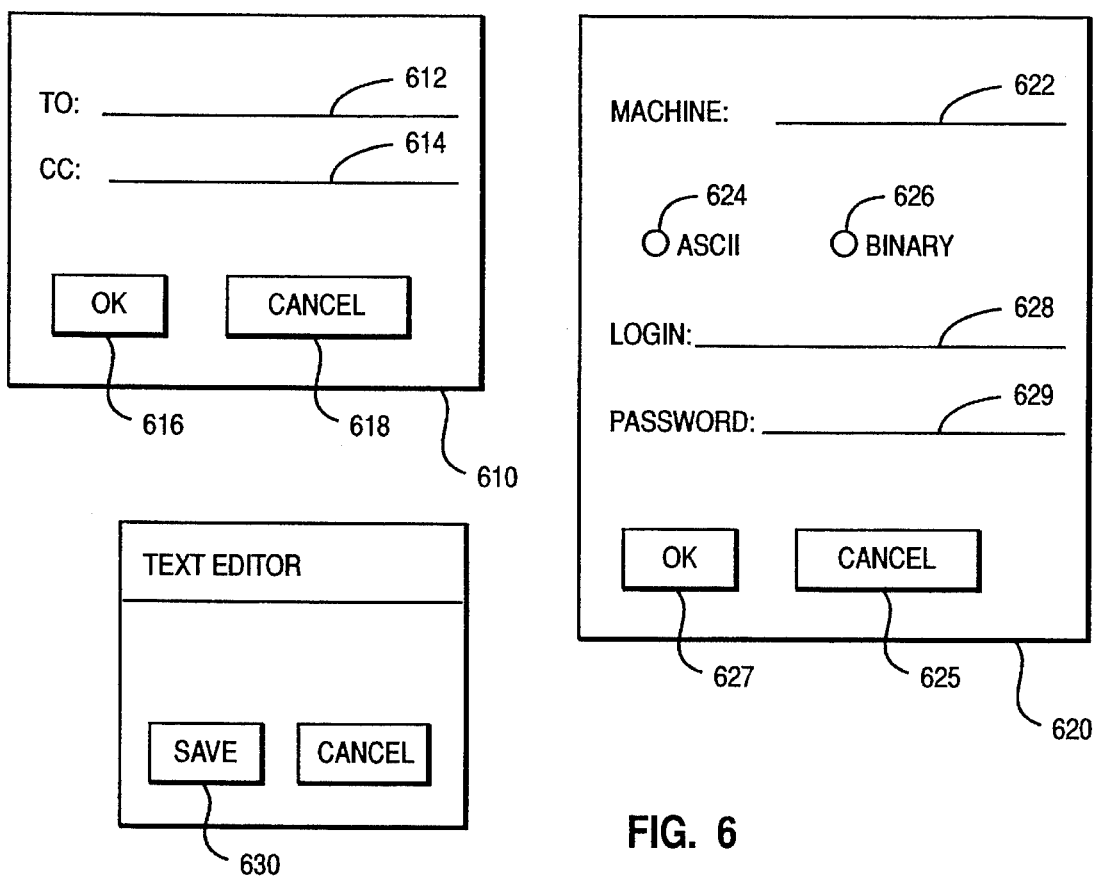
FIG. 6 illustrates three dialog windows for entering the transmission destination.

If the user selected mail button 512, FTP button 514, or button 516, the system displays window 610, 620, or 630, respectively. Referring to FIG. 6, window 610 enables the user to enter the address in the "To:" field 612. This specific transporter always sends the objects that are dropped on it to that address. The user can also transmit a courtesy copy to another user via "cc:" field 614. When completed, the user clicks "OK" button 616. To cancel an entry, the user clicks "cancel" button 618.

Window 620 is the FTP pop-up window. This appears if the user selects FTP button 514. It enables the user to enter the destination machine address in "machine" field 622. Depending on the type of file to be transmitted, the user selects either ASCII or binary by clicking ASCII button 624 or binary button 626. The user enters the login sequence for the destination machine at login field 628. Furthermore, the user enters the password for the destination machine in password field 629. When completed, the user clicks "OK" button 629. To cancel an entry, the user clicks "cancel" button 625.

Furthermore, window 630 is a text editor. This appears if the user selected button 516. This enables the user to program and store a series of instructions for transmitting an object to a desired location. These instructions vary according to the host operating system.

Once the user has completed and exited one of the windows in FIG. 6, the definition of the transporter is complete and that transporter appears on the desktop as illustrated in FIG. 2, except that the name of the transporter will appear in label field 220.

Again returning to FIG. 3, the system determines at 335 whether the user has dropped an existing object on a transporter. If not, the user decides at 340 whether to return to 315 or to quit at 345.

Figure 7:
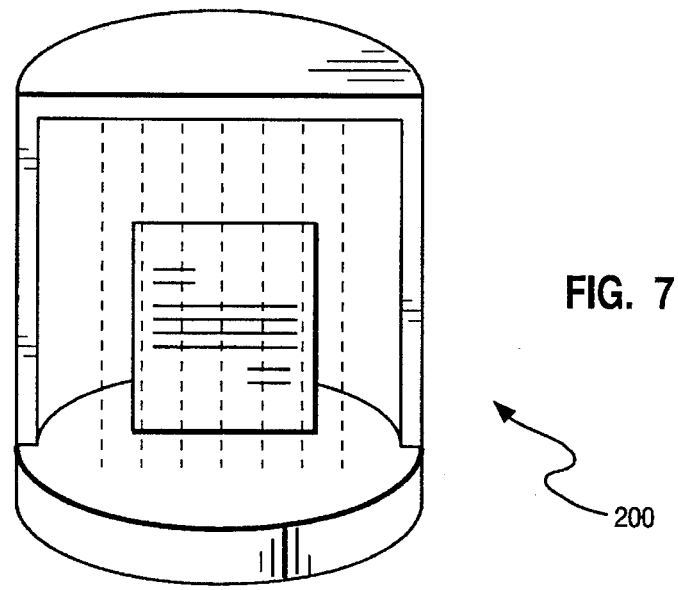
FIG. 7 is a schematic diagram of the transporter icon of the present invention having a object icon residing therein and illustrating a raining effect.

If an object icon has been dropped on the transporter, the system places a small replica of that object icon within transporter icon 200 (see FIG. 7). Furthermore, the system examines the type of object dropped on the transporter and searches the database for the characteristics of that object type at 350.

For example, if the dropped object is a text file called "report.txt", the system searches the "object type definitions" database and finds an object type with the name field "*.txt". The contents of the "action" field for this definition is "Mail". Therefore, the transporter will automatically transmit the report using the "Mail" command.

Next, the system examines the transporter type at 355. If the transporter is specific, control drops to 365. If the transporter is general, the system asks the user for additional transmission and destination information. The user selects the action type and destination at 360. To do this, the system automatically displays window 500 (see FIG. 5) on the display. Label field 510 automatically displays "TRANSPORTER". As previously described, the user enters the appropriate commands in the fields of window 500.

At 365, the system examines the transporter's destination and action type and, subsequently, transmits the object to that destination. While transmitting, at 370, the user observes a "raining effect" over the transporter icon and replica of the object icon (see FIG. 7). A slow "dissolving effect" of the replica object icon follows the "raining effect" at 375. That is, the replica object icon slowly disappears. Once transmitted, the replica object icon no longer resides within the transporter icon. The user will also hear an audio effect as the system transmits the object. Control then returns to 340, where the system provides the user with the option to quit at 345 or continue at 315.

While the invention has been shown and described with reference to particular embodiments thereof, it will be understood by those skilled in the art that the foregoing and other changes in form and detail may be made therein without departing from the spirit and scope of the invention.

We claim:

1. A system for transmitting a computer object of a particular object type, comprising:

an icon representing said computer object to be transmitted;

a transporter icon having predefined transmission characteristics, wherein said transmission characteristics comprise a destination address and transmission command;

means for defining object characteristics of said object type, wherein said object characteristics comprise object type identification, permissions, and transmission protocol, wherein said characteristics are defined using an object type template window;

means for positioning said icon on said transporter icon; and a channel for transmitting said computer object to a first destination according to said object characteristics and said transmission characteristics.

2. The system according to claim 1 wherein said defining means comprises a means for accessing said window having at least one entry field.

3. The system according to claim 2 wherein said accessing means comprises an object type template.

4. The system according to claim 1 wherein said transmission characteristics comprise a means for transmitting a courtesy copy to a second destination.

5. The system according to claim 1 further comprising a transporter create template for defining said transmission characteristics of said transporter.

6. The system according to claim 1 further comprising a means for disintegrating said icon within said transporter during transmission.

7. A method for transmitting a computer object of a particular object type to a first destination, comprising the steps of:

displaying an icon representing said computer object to be transmitted;

defining transmission characteristics of a transporter icon, wherein said transmission characteristics comprise a destination address and transmission command;

defining object characteristics of said object type, wherein said object characteristics comprise object type identification, permissions, and transmission protocol, wherein said characteristics are defined using an object type template window;

means for positioning said icon on said transporter icon; and transmitting said computer object to said first destination according to said object characteristics and said transmission characteristics.

8. The method according to claim 7 wherein said step of defining transmission characteristics comprises the for accessing said window having at least one entry field.

9. The method according to claim 7 further comprising the steps of storing said transmission characteristics and said object characteristics in a computer readable medium.

10. The method according to claim 7 wherein said transmitting step comprises the step of dropping said computer object on said transporter icon.

* * * * *